United States Patent [19]

Niedenzu et al.

[11] Patent Number: 5,707,437

[45] Date of Patent: Jan. 13, 1998

[54] SILANIZED TITANIUM DIOXIDE PIGMENTS RESISTANT TO DISCOLORATION WHEN INCORPORATED IN POLYMERS

[75] Inventors: Philipp Martin Niedenzu, New Johnsonville; John Darrel Walker, Hurricane Mills; Laura Faye McClure, Memphis, all of Tenn.

[73] Assignee: E. I. Du Pont de Nemours and Company, Wilmington, Del.

[21] Appl. No.: 707,043

[22] Filed: Aug. 30, 1996

Related U.S. Application Data

[63] Continuation of Ser. No. 392,707, Feb. 23, 1995, abandoned, which is a continuation-in-part of Ser. No. 203,137, Feb. 28, 1994, abandoned.

[51] Int. Cl.$^6$ ............................................. C09C 1/36
[52] U.S. Cl. .............. 106/446; 106/287.13; 106/287.14; 106/287.16; 106/287.17; 106/436; 106/437; 106/445
[58] Field of Search ..................... 106/445, 446, 106/287.16, 287.17, 287.13, 287.14

[56] References Cited

U.S. PATENT DOCUMENTS

| | | | |
|---|---|---|---|
| Re. 30,450 | 12/1980 | Iannicelli | 106/475 |
| 2,440,101 | 4/1948 | Krieble | 556/402 |
| 2,717,246 | 9/1955 | Kienle | 106/430 |
| 3,088,840 | 5/1963 | Arkless et al. | 106/437 |
| 3,132,961 | 5/1964 | Pierpoint et al. | 106/490 |
| 3,545,994 | 12/1970 | Lott, Jr. et al. | 106/308 |
| 3,864,140 | 2/1975 | Ferrigno | 106/462 |
| 4,221,687 | 9/1980 | Minagawa et al. | 524/114 |
| 4,247,708 | 1/1981 | Tsutsumi et al. | 556/456 |
| 4,810,305 | 3/1989 | Braun et al. | 106/499 |
| 4,882,225 | 11/1989 | Fukui et al. | 428/405 |
| 5,372,905 | 12/1994 | Deusser et al. | 430/110 |
| 5,415,936 | 5/1995 | Deusser et al. | 428/405 |
| 5,501,732 | 3/1996 | Niedenzu et al. | 106/447 |
| 5,560,845 | 10/1996 | Birmingham, Jr. et al. | 219/121.85 |
| 5,562,990 | 10/1996 | Tooley et al. | 428/403 |

FOREIGN PATENT DOCUMENTS

| | | |
|---|---|---|
| 88180/91 | 6/1992 | Australia . |
| 2012017 | 10/1970 | Germany . |
| 4202695-C2 | 12/1993 | Germany . |
| 3-39307 | 6/1991 | Japan . |
| 5-139748 | 6/1993 | Japan . |
| 1442756 | 7/1976 | United Kingdom . |

OTHER PUBLICATIONS

PCT International Search of international appln. No. PCT/US95/02888 filed Feb. 28, 1995.

Derwent Abstract 93:256494/32 of DE 4202895–C2 (Dec. 1993).

Lappert et al., Developments in Inorganic Polymer Chemistry, pp. 225–255 (1962). (no month).

Brinker, Scherer, Borosilicate Systems, *Sol–Gel Science*, pp. 223–226 (1990). (no month).

Witucki, A Silane Primer: Chemistry and Applications of Alkoxy Silanes, *Back to Basics*, pp. 57–60, (Jul. 1993).

Irwin, A.D., Spectroscopic Investigations of Borosiloxand Bond Formation in the Sol–Gel Process, *Non–Crystalline Solids*, pp. 191–205, 198 (1989). (no month).

D. A. Foucher et al., Synthesis, Properties, and Ring–Ring Transformation Reactions of Cyclic Siloxanes Incorporating Skeletal Boron Atoms: X–Ray Crystal Structures of Strained Boracyclotrisiloxane and the Boracyclotetrasiloxane, *Inorganic Chemistry*, pp. 3034–3043 (1992). (no month).

Union Carbide Corporation, *Filler Treatment*, (1968). (no month).

Voronkov, M. G. et al., *Zhur. Obshchei Khim*, 27 (1957) 1476. (no month).

McCusker, P. A. et al., *J. Am. Chem. Soc.*, 80 (1958). (no month).

Abel et al., *J. Chem. Soc.*, 690 (1959). (no month).

*Primary Examiner*—Mark L. Bell
*Assistant Examiner*—Scott L. Hertzog
*Attorney, Agent, or Firm*—Daniel W. Sullivan

[57] ABSTRACT

Titanium dioxide pigment particles with treatment of an organosilicon compound and boric acid and/or boron oxide is disclosed. The product has a greater resistance to becoming discolored upon exposure to ultraviolet light when incorporated in polymers, particularly polyolefins such as polyethylene.

7 Claims, No Drawings

SILANIZED TITANIUM DIOXIDE PIGMENTS RESISTANT TO DISCOLORATION WHEN INCORPORATED IN POLYMERS

This is a continuation of application Ser. No. 08/392,707 filed on Feb. 23, 1995, now abandoned, which is a continuation-in-part of application Ser. No. 08/203,137, filed on Feb.28, 1994, abandoned.

FIELD OF THE INVENTION

The present invention relates to white and/or white-pigmented polymers (particularly, polyolefins, such as polyethylene, containing a phenolic antioxidant, such as butylated hydroxytoluene) comprising $TiO_2$ particles treated with an organosilicon compound and boric acid ($H_3BO_3$) or boron oxide ($B_2O_3$) to enhance properties of $TiO_2$ when incorporated in polymers such as resistance to photochemical discoloration upon aging, dispersibility and humidity resistance.

BACKGROUND OF THE INVENTION

Inorganic pigments, and especially titanium dioxide, are often incorporated in various polymers as whiteners, tinting agents or opacifiers. Also typically incorporated in such polymers are hindered amine light stabilizers ("HALS"), phenolic antioxidants (e.g., butylated hydroxytoluene, commonly referred to as "BHT", butylated hydroxyanisole referred to as "BHA", and related materials), flame retardants (e.g., $Sb_2O_3$), and UV stabilizers.

However, a common problem with the use of such pigments (and especially titanium dioxide with such additives) is that the pigments can either promote the reaction of polymer additives with each other or react directly with one or more of the additives. These reactions lead to the formation of chromophores which usually reflect light in the yellow portion of the spectrum and hence produce a "yellowing" of the polymer, which is highly undesirable. The aforementioned discoloration problem is especially apparent in white pigmented polyolefins and/or white pigmented rubber and elastomeric materials.

While methods exist that somewhat inhibit the foregoing discoloration problem, they are deficient in one or more areas, e.g., they (1) can be expensive and/or complex to apply; (2) can cause deterioration of some polymer properties and/or cause processing problems such as difficulty in extruding the films or dispersing pigments in dry blends of the polymers; and or (3) can cause a loss of optical properties due to high humidity or high temperatures.

The following patents contain disclosures of interest to the present invention:

U.S. Pat. No. 3,132,961 disclose fillers or pigments treated with diorganopolysiloxane in the presence of nitric acid, hydrochloric acid, formic add, acetic acid, monochloroacetic acid and trifluoroacetic acid.

U.S. Pat. No. 3,545,994 discloses masking the surface of $TiO_2$ by coating it with hydrous oxides of titanium, aluminum or silicon.

U.S. Pat. No. 3,904,565 discloses a polymer color inhibitor consisting of a mixture of a fatty acid salt, a polyalkene glycol ether, a thiobisphenol, and an organophosphite.

U.S. Pat. No. 3,673,146 discloses the use of triorganophosphites to inhibit polymer discoloration.

U.S. Pat. No. 4,357,170 discloses the use of a mixture of an organophosphate/alkanol amine addition product and a polyol.

Each of the prior art compositions and processes suffers from various deficiencies, and further improvements are desirable.

SUMMARY OF THE INVENTION

The present invention relates to the resistance of discoloration of polymers which are pigmented with titanium dioxide. The invention involves treating the titanium dioxide with an effective amount of an organosilicon compound and boric acid or boron oxide. The resulting composition when incorporated into a polymer exhibits humidity resistance, enhanced dispersion and resistance to yellowing or discoloration of the pigmented polymer upon exposure to ultraviolet light ("UV"). The resulting compositions are particularly useful in powder coatings and/or plastics applications.

DETAILED DESCRIPTION OF THE INVENTION

The titanium dioxide pigments useful in the present invention generally are in the rutile or anatase crystalline form and have an average ultimate particle size of less than 0.5 micron and generally in the range of 0.15 to 0.40 micron. If the as-produced pigment is originally agglomerated, it is preferred that such pigment be micronized in a fluid energy mill or otherwise milled so that the average apparent particle size approaches the ultimate particle size prior to treatment with boric acid or boron oxide and organosilicon compound in order to render the treatment most effective. Typically, from about 0.0075 to about 2.2%, by weight, boric acid and about 0.0042 to about 1.3%, by weight, boron oxide based on the titanium dioxide pigment, is applied to the titanium dioxide pigment. The application of the boric acid or boron oxide to the pigment can be done either by dry blending or by mixing in an aqueous slurry. Both methods appear to be substantially equal as regards performance of the treated pigment. Thus, dry blending of the pigment with the boric acid or boron oxide is preferred because it is a simpler method to perform. Surprisingly, sodium tetraborate ($Na_2B_4O_7$) is ineffective for use herein. The application of boric acid or boron oxide, and the organosilicon treatment may be sequential or concurrent.

The titanium dioxide used to prepare the pigment of the invention can be of the conventional rutile or anatase cyrstalline form prepared by either a chloride or a sulfate process as described in greater detail in "The Pigment Handbook", Vol. 1, 2nd Ed., John Wiley & Sons, NY (1988), the teachings of which are incorporated herein by reference.

The titanium dioxide pigments may also contain ingredients added thereto to improve the durability characteristics or other properties such as dispersibility of the pigment. Thus, the pigment may contain additives and/or hydrous oxides, such as alumina, silica, tin oxide, lead oxide, chromium oxide as well as triethanol amine, inorganic phosphates, etc. Pigments which possess an inorganic hydrous silica treatment as part of their standard treatment in manufacture possess an inherent, though often unsubstantial, resistance to discoloration. Pigments that do not possess such a treatment do not exhibit this additional resistance.

"Silanized" $TiO_2$ is defined herein to refer to either $TiO_2$ treated with at least one silane, or a mixture of at least one silane and at least one polysiloxane compound (collectively referred to herein as organosilicon compounds).

Suitable silanes have the formula:

$$R_xSi(R')_{4-x}$$

wherein

R is a nonhydrolyzable aliphatic, cycloaliphatic or aromatic group
having at least 1 to about 20 carbon atoms;

R' is a hydrolyzable group such as an alkoxy, halogen, acetoxy or hydroxy or mixtures thereof; and x=1 to 3.

For example, silanes useful in carrying out the invention include hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane. Additional examples of silanes include, R=8–18 carbon atoms; R'=chloro, methoxy, hydroxy or mixtures thereof; and x=1 to 3. Preferred silanes are R=8–18 carbon atoms; R'=ethoxy; and x=1 to 3. Mixtures of silanes are contemplated equivalents. Weight content of the silane, based on pigment is typically about 0.1 to about 10.0 weight %, preferably about 0.6 to about 1 weight %.

For example, solutions with boric acid:organosilicon compound molar ratios of about 1:1 to 1:4, respectively, are desirable, with 1:2 to 1:3, respectively, as especially preferred. Solutions with boron oxide:organosilicon compound molar ratios of about 2.3:1 to 2.3:4 respectively, are desirable, with 2.3:2 to 2.3:3, respectively, as especially preferred.

In an alternative embodiment, a mixture of at least one silane with at least one polysiloxane is useful in carrying out the invention. Suitable polysiloxanes have the formula:

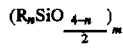

wherein

R is organic or inorganic groups;
n=0–3; and
m≥2.

For example, polydimethylsiloxane (PDMS), vinyl phenylmethyl terminated dimethyl siloxanes, divinylmethyl terminated polydimethyl siloxane and the like are suitable polysiloxanes. PDMS is a preferred polysiloxane. The silane useful in the mixture may be the silane described above with R=1–8 carbon atoms, R'=alkoxy and x=1 preferred. Weight content of the silane and polysiloxane, based on total pigment, is about 0.1 to about 10.0 weight %, preferably from about 0.6 to 1 weight %. Especially preferred is R=4 or 8 carbon atoms, R'=alkoxy and x=1; and 1 PDMS. The ratio of silane to polysiloxane can be 1 silane:2 polysiloxane up to 2 silane:1 polysiloxane. An especially preferred ratio is 1 silane: 1 polysiloxane.

The silane and polysiloxane are commercially available or can be prepared by processes known in the art such as those described in "Organosilicon Compounds", S. Pawlenko, et al., New York (1980), the teachings of which are incorporated herein by reference. The method of addition is not especially critical and the TiO$_2$ pigment may be treated with the silane in a number of ways. For example, the silane addition can be made neat or prehydrolyzed from a slurry, a filtration step, during drying or at a size operation such as a fluid energy mill, e.g., micronizer, or media mill as described in greater detail in Niedenzu et al., U.S. Pat. No. 5,501,732 the teachings of which are incorporated herein by reference, or post blending after micronizing. For example, U.S. Pat. No. 3,834,924 describes organosilane and pigment dispersion mixed or blended directly in a suitable solids mixing apparatus. An example of post blending is described in greater detail in U.S. Pat. Nos. 3,915,735 and 4,141,751. The polysiloxane addition can be made in conjunction with the silane or post addition to the silanized pigment. The organosilicon addition is described in greater detail below. If water, either a liquid or vapor (steam), is present as a component of the process stream, hydrolysis of the hydrolyzable groups of the silane will occur and the silane coating will bond to a TiO$_2$ base and/or the coated TiO$_2$. Prehydrolyzing the silane is a preferred step in treating the TiO$_2$ pigment with the silane. If the silane is added neat to a TiO$_2$ base and/or the coated TiO$_2$, then moisture adsorbed on the TiO$_2$ will effect the hydrolysis, but at a lower rate than if excess moisture is present. Hydrolysis of silanes is described in greater detail in "Organofunctional Silanes" by Union Carbide (1991), the teachings of which are incorporated herein by reference.

The resulting pigments may be further spray dried and ground in a fluid energy mill if the organosilicon addition occurred at the slurry or filtration step.

For example, the process of the invention may include the steps of:

(a) dissolving boric acid in a liquid organosilicon compound in a molar ratio of about 1:1 to about 1:4, respectively, (b) applying the solution to TiO$_2$ by spraying; and (c) milling the treated TiO$_2$ in a fluid energy mill.

Alternatively, the solution from step (a) may be sprayed onto the TiO$_2$ or added to an aqueous slurry after the pigment has been dried. The boron oxide:organosilicon molar ratio is described above.

Polymers which are suitable for use in the present invention include, by way of example but not limited thereto, polymers of ethylenically unsaturated monomers including olefins such as polyethylene, polypropylene, polybutylene, and copolymers of ethylene with higher olefins such as alpha olefins containing 4 to 10 carbon atoms or vinyl acetate, etc.; vinyls such as polyvinyl chloride, polyvinyl esters such as polyvinyl acetate, polystyrene, acrylic homopolymers and copolymers; phenolics; alkyds; amino resins; polysiloxanes; epoxy resins; polyamides, polyurethanes; phenoxy resins; polysulfones; polycarbonates; polyether and chlorinated polyesters; polyethers; acetal resins; polyimides; and polyoxyethylenes. The polymers according to the present invention also include various rubbers and/or elastomers either natural or synthetic polymers based on copolymerization, grafting, or physical blending of various diene monomers with the above-mentioned polymers, all as generally known in the art. Thus generally, the present invention is useful for any such white or white-pigmented plastic or elastomeric compositions (collectively referred to herein a white or white-pigmented polymers) that are susceptible to photochemical discoloration. For example, but not by way of limitation, the invention is felt to be particularly useful for plastics containing a phenolic antioxidant additive such as butylated hydroxytoluene (BHT), i.e., 2,6-di-t-butyl-4-methylphenol, or other structurally similar alkyl-substituted phenols in that photochemical reaction products of BHT include yellow producing quinone compounds. Further by way of example, the invention is felt to be useful for white-pigmented rubbers and elastomers containing an alkylated hydroxyanisole antioxidant additive; e.g., butylated hydroxyanisole (BHA), typically a mixture of 2-tert-butyl-4-methoxyphenol and 3-tert-butyl-4methoxyphenol, which for purposes of this invention is to be considered a phenolic antioxidant. The invention is at its highest usefulness when applied to polyolefins because of their greater susceptibility to yellowing upon exposure to UV when pigmented with titanium dioxide.

The resulting materials of the invention may be used to pigment plastics in any of the customary ways, typically be melt compounding techniques known in the art. Similarly, powder coating compositions may be prepared with the pigments of the invention in any of the conventional ways. These procedures are set forth in greater detail in "International Plastics Handbook", 2nd Ed., H. Saechtling, NY (1987), which is incorporated herein by reference to show such procedures.

A wide variety of conventional additives may be included in the polymers as is necessary, desirable or conventional for the intended end use. Such additives include catalysts, initiators, antioxidants (e.g., BHT or BHA), blowing agents, ultraviolet light stabilizers (e.g., "HALS"), organic pigments including tinctorial pigments, plasticizers, leveling agents, flame retardants, anti-cratering additives, and the like.

Organosilicon treatment of $TiO_2$ with boric acid or boron oxide renders a composition with a unique combination of improved photostability, enhanced dispersion and resistance to humidity thus resulting in improved optical properties when incorporated into polymers.

The following Examples are construed as illustrative and not limitative of the remainder of the disclosure.

EXAMPLES 1–4

Granular boric acid was dissolved in octyl triethoxy silane, at a molar ratio of 1:3 respectively, with vigorous stirring for 2 hours at 70° C.

The solution was sprayed onto rutile $TiO_2$ pigment, available from E.I. du Pont de Nemours and Company, Wilmington, Del., U.S.A., and suitable for use in plastics. Surface treatments are reported in Table 1.

The treated pigment was ground in a fluid energy mill such as a micronizer with steam.

Samples with treatments from 0 to 1 weight percent were prepared and evaluated for optical properties, resistance to yellowing in plastics, and dispersibility in plastics using the following tests.

EXAMPLE 5

Granular boric acid was dissolved in butyltrimethoxysilane, at a molar ratio of 3:1, respectively, with vigorous stirring for 2 hours at 70° C.

The solution was sprayed onto rutile $TiO_2$ pigment, available from E.I. du Pont de Nemours and Company, Wilmington, Del., U.S.A., and suitable for use in plastics. Surface treatments are reported in Table 1.

The treated pigment was ground in a fluid energy mill such as a micronizer with steam.

Samples with treatments of 1 weight percent were prepared and evaluated for optical properties, resistance to yellowing in plastic and dispersibility in plastics using CBU, TS, UT, Nujol yellowing test and screen test. Results are shown in Table 2.

EXAMPLE 6

Same as Example 5 except the silane was changed to a mixture of octyltriethoxysilane and polydimethylsiloxane (PDMS). The molar ratio of boric acid:organosilicon compound was 3:1.

CBU

Carbon black undertone (CBU) is an inverse measure of particle size. It was determined by mulling together a suitable liquid, such as a light colored oil, and standard weights of the sample and a standard carbon black. The mixture was spread with a standard mixture on a panel and the relative blueness of the gray mixtures observed. The degree of blueness was a measure of particle size, the finer particles giving the bluer undertone or higher CBU. Conventional $TiO_2$ pigments have a CBU of about 9.

Percent silane and/or polysiloxane/$H_3BO_3$ reacted with the $TiO_2$ surface was determined by carbon analysis, i.e., heated the coated pigment in oxygen, in a furnace, and measured $CO_2$ evolved.

TINTING STRENGTH (TS) AND UNDERTONE (UT)

Optical properties of the $TiO_2$ pigment were evaluated by dispersing $TiO_2$ in black vinyl compound on a two-roll mill. The tristimulus values, X, Y, Z, of the vinyl sheet were measured with a Hunterlab Labscan spectrocolorimeter, and TS an UT were calculated versus standards prepared at the same time. TS and UT were derived from Y, and Z/X respectively. $L^*$, $a^*$, and $b^*$, the color space coordinates defined by CIE (Commission Internationale de l'Edairage) in 1976, can be read directly on the spectrocolorimeter.

The TS range for $TiO_2$ pigments was about 80 to 120. The UT range was about –0.070 to +0.050.

NUJOL YELLOWING TEST

This test determined resistance to yellowing in plastics, a measure of photochemical discoloration.

A masterbatch of test medium was made by compounding 100 grams of Nujol, 2 grams of butylated hydroxyl toluene (BHT), 2 grams of Tinuvin 770, a commercial hindered amine antioxidant, and 10 grams of Vaseline for thickening. 1.2 grams of masterbatch was mulled with 0.64 grams of the $TiO_2$ pigment to a smooth dispersion.

A doctor place was used to form a thin film of the masterbatch/pigment composite on a microscope slide. The color components $L^*$, $A^*$, and $B^*$, were measured using a Lab-Scan spectrocolorimeter. The film was exposed to 24 hours of ultra violet radiation in a temperature-controlled enclosed box. The color components were then measured. The change in $b^*$ is a measure of yellowing stability. The lower the value of delta $b_*$ the more photostable the pigment. Delta $b^*$ values for Examples 1–4 are shown in Table 2.

SCREEN TEST

This was a test of dispersion. A 50 weight percent concentrate of $TiO_2$/low-density polyethylene was prepared in a Banbury-type® mixer (available from Farrel Corp., Ansonia, Conn., U.S.A.), chopped into small granules, and extruded on Killion Extruder through a 325 mesh screen. The undispersed $TiO_2$ grit particles retained on the screen were measured on a Texas Nuclear single elemental analyzer. The higher the number the poorer the dispersion of the $TiO_2$ in the plastic.

Results are shown in Tables 1 and 2. There was no loss of optical properties (TS and UT) for silane and/or polysiloxane/H3B03 treatment. If exposed to high humidity and high temperature, it is believed that significant loss of optical properties would be observed for $TiO_2$ without organosilicon treatment (Example 1) over the silanized $TiO_2$ of the present invention (Examples 2–4). Excellent retention of the silane on the pigment surface, at over 90 percent, an improved resistance to yellowing and dispersibility in an organic matrix was demonstrated.

TABLE 1

| Ex. | Silane Treatmt. (wt. %) | Al₂O₃ | SiO₂ (wt. %) | C | CBU | Silane and/or polysiloxane H₃BO₃ Reacted (%) |
| --- | --- | --- | --- | --- | --- | --- |
| 1 | 0 | 1.43 | 0.06 | 0.063 | 16.1 | — |
| 2 | 0.3 | 1.44 | 0.13 | 0.178 | 16.2 | 100 |
| 3 | 0.7 | 1.42 | 0.23 | 0.276 | 16.3 | 90 |
| 4 | 1.0 | 1.42 | 0.28 | 0.359 | 15.7 | 90 |
| 5 | 1.0 | 1.43 | 0.24 | 0.26 | 15.4 | 90 |
| 6 | 1.0 | 1.42 | 0.27 | 0.59 | 14.1 | * |

*undetermined

TABLE 2

| Ex. | L* | A* | b* | TS | UT | Delta b* | Screen Pack |
| --- | --- | --- | --- | --- | --- | --- | --- |
| 1 | 97.12 | −0.78 | 2.10 | 106 | 0.017 | 15.8 | 23 |
| 2 | 98.39 | −0.75 | 2.17 | 109 | 0.024 | 7.0 | 7 |
| 3 | 97.75 | −0.81 | 1.77 | 107 | 0.028 | 0.9 | 8 |
| 4 | 97.54 | −0.83 | 1.71 | 107 | 0.028 | −0.2 | 9 |
| 5 | 97.95 | −0.65 | 1.64 | 103 | 0.13 | 1.4 | 15 |
| 6 | 97.92 | −0.75 | 1.41 | 102 | 0.25 | 1.1 | 8 |

From the foregoing description, one skilled in the art can easily ascertain the essential characteristics of this invention, and without departing from the spirit and scope thereof, can make various changes and modifications of the invention to adapt it to various usages and conditions.

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A titanium dioxide pigment comprising TiO₂ particles bearing a coating of boric acid present in the amount of about 0.0075 to about 2.2% by weight, based on the weight of the TiO₂ pigment, and an organosilicon compound present in the amount of about 0.1 to about 10% by weight, based on the weight of the TiO₂, wherein the organosilicon compound has the formula:

$$R_x Si(R')_{4-x}$$

wherein

R is a nonhydrolyzable aliphatic, cycloaliphatic or aromatic group having at least 8 to about 20 carbon atoms;

R' is a hydrolyzable group selected from an alkoxy, halogen, acetoxy or hydroxy or mixtures thereof, and x=1 to 3.

2. A process for reducing the tendency for a TiO₂ pigmented plastic containing a phenolic antioxidant additive to yellow and discolor upon aging comprising the steps of:

(a) adding an effective amount of boric acid or boron oxide to TiO₂; and (b) treating with an organosilicon compound such as to inhibit and reduce the rate of photochemical discoloration and yellowing of said plastic when exposed to light.

3. A process for reducing the tendency for a TiO₂ pigmented plastic containing a phenolic antioxidant additive to yellow and discolor upon aging comprising the steps of:

(a) dissolving boric acid in the organosilicon compound in a molar ratio of 1:1 to 1:4, respectively; and (b) applying the solution to TiO₂;

such as to inhibit and reduce the rate of photochemical discoloration and yellowing of said plastic when exposed to light.

4. The process claim 3 wherein boron oxide is dissolved in the organosilicon compound in a molar ratio of 2.3:1 to 2.3:4, respectively.

5. A titanium dioxide pigment comprising TiO₂ particles bearing a coating of boric acid present in the amount of about 0.0075 to about 2.2% by weight, based on the weight of the TiO₂ pigment, and an organosilicon compound present in the amount of about 0.1 to about 10% by weight, based on the weight of the TiO₂, wherein the organosilicon compound is a mixture of the compounds (i) and (ii):

$$R_x Si(R')_{4-x} \quad \text{(i)}$$

wherein

R is a nonhydrolyzable aliphatic, cycloaliphatic or aromatic group having at least 8 to about 20 carbon atoms;

R' is a hydrolyzable group selected from an alkoxy, halogen, acetoxy or hydroxy or mixtures thereof, and x=1 to 3, and $$(R_n SiO_{\frac{4-n}{2}})_m \quad \text{(ii)}$$

wherein

R is an organic or inorganic group n=0–3; and m≧2.

6. A titanium dioxide pigment comprising TiO₂ particles bearing a coating of boron oxide present in the amount of about 0.0042 to about 1.3% by weight, based on the weight of the TiO₂ pigment, and an organosilicon compound present in the amount of about 0.1 to about 10% by weight, based on the weight of the TiO₂, wherein the organosilicon compound has the formula:

$$R_x Si(R')_{4-x}$$

wherein

R is a nonhydrolyzable aliphatic, cycloaliphatic or aromatic group having at least 8 to about 20 carbon atoms;

R' is a hydrolyzable group selected from an alkoxy, halogen, acetoxy or hydroxy or mixtures thereof, and x=1 to 3.

7. A titanium dioxide pigment comprising TiO₂ particles bearing a coating of boron oxide present in the amount of about 0.0042 to about 1.3% by weight, based on the weight of the TiO₂ pigment, and an organosilicon compound present in the amount of about 0.1 to about 10% by weight, based on the weight of the TiO₂, wherein the organosilicon compound is a mixture of the compounds (i) and (ii):

$$R_x Si(R')_{4-x} \quad \text{(i)}$$

wherein

R is a nonhydrolyzable aliphatic, cycloaliphatic or aromatic group having at least 8 to about 20 carbon atoms;

R' is a hydrolyzable group selected from an alkoxy, halogen, acetoxy or hydroxy or mixtures thereof, and x=1 to 3, and $$(R_n SiO_{\frac{4-n}{2}})_m \quad \text{(ii)}$$

wherein

R is an organic or inorganic group n=0–3; and m≧2.

* * * * *